United States Patent [19]
Chen

[11] Patent Number: 6,119,148
[45] Date of Patent: Sep. 12, 2000

[54] COMPUTER VIDEO SIGNAL DISTRIBUTOR BETWEEN A COMPUTER AND A PLURALITY OF MONITORS

[75] Inventor: Sun Chung Chen, Taipei, Taiwan

[73] Assignee: Aten International Co., Ltd., Taipei, Taiwan

[21] Appl. No.: 09/124,226

[22] Filed: Jul. 29, 1998

[51] Int. Cl.[7] ................................................. G06F 13/00
[52] U.S. Cl. .................... 709/204; 709/248; 370/542; 348/8; 348/15; 348/571; 348/707; 330/250
[58] Field of Search ................................... 710/101, 100; 330/250, 253, 254; 345/98; 348/707–709, 655, 722, 571, 8, 15; 386/1, 46; 455/6.3, 6.2; 709/201, 204, 248, 249; 370/464, 486, 542, 543, 544

[56] References Cited

U.S. PATENT DOCUMENTS

| | | | |
|---|---|---|---|
| 4,518,986 | 5/1985 | Hinn et al. | 348/190 |
| 4,803,464 | 2/1989 | Holms et al. | 340/732 |
| 5,257,390 | 10/1993 | Asprey | 710/101 |
| 5,818,538 | 10/1998 | Kim | 348/525 |
| 5,865,561 | 1/1999 | Becher | 370/537 |
| 5,956,076 | 9/1999 | Hoess | 348/12 |
| 5,999,966 | 12/1999 | McDougall et al. | 709/204 |

*Primary Examiner*—Ario Etienne
*Attorney, Agent, or Firm*—McDermott, Will & Emery

[57] ABSTRACT

A computer video signal distributor receives as inputs the video signals of a computer, and then processes and distributes these video signals to a plurality of monitors. The computer video signal distributor includes three transistor common based voltage amplifying circuits for inputting red, green, blue video signals of the computer respectively, then amplifying these video signals for outputting. Three sets of transistor emitter follower current amplifying circuits are provided for connecting respectively with one of the outputs of the three voltage amplifying circuits, and provide sufficient frequency response for inputted video signals, and distributing the inputted video signals according to the number of monitors. A synchronous signal buffering device is provided for receiving synchronous signals of the computer, and generating a plurality of sets of synchronous signals according to the number of the monitors. A plurality of monitor input interfaces are provided for receiving the video outputs of the three sets of current amplifying circuits, and receiving the plurality of sets of synchronous signals from the synchronous buffering device, then outputting respectively to the monitors.

6 Claims, 5 Drawing Sheets

COMPUTER VIDEO SIGNAL DISTRIBUTOR BETWEEN A COMPUTER AND A PLURALITY OF MONITORS

FIELD OF THE INVENTION

The present invention relates to a high frequency video signal distributor, and more particularly to a computer video signal distributor which can distributes video signals of a computer into a plurality of independent monitors so as to achieve the purpose of video distributing function.

BACKGROUND OF THE INVENTION

It is a known method to distribute video signals from a computer to a plurality of monitors by means of operational amplifying ICs to form voltage amplifing circuit and current amplifing circuit. However, since video signals higher than 100 MHz will attenuate abruptly when passing through an IC, the bandwidth of the known method will be limited. If we use high frequency operational amplifing IC to design, the cost will be increased dramatically. Moreover, an operational amplifying IC needs both a positive voltage source and a negative voltage source, this makes the related circuit more complicated and causes more noises.

OBJECTS OF THE INVENTION

It is therefore an object of the present invention to provide a computer video signal distributor to distribute the inputted high frequency video signals into a plurality of monitors, wherein transistors are used to design the voltage amplifying circuits and current amplifying circuits instead of operational amplifying ICs, so the bandwidth of the transmitted video signals can be increased, and only a positive voltage source is needed, the related circuit design is therefore simpler than before.

It is another object of the present invention to provide a low cost computer video signal distributor. Since transistors are used as the main components of the voltage amplifying circuits and current amplifying circuits, the total cost is therefore lower than the design by operational amplfying IC, and transistors can also be replaced easily according to voltage gain and bandwidth requirements.

BRIEF DESCRIPTION OF THE DRAWINGS

The present invention can be better understood by detailed description of the following drawings, in which.

DETAILED DESCRIPTION OF THE INVENTION

Figure 1:
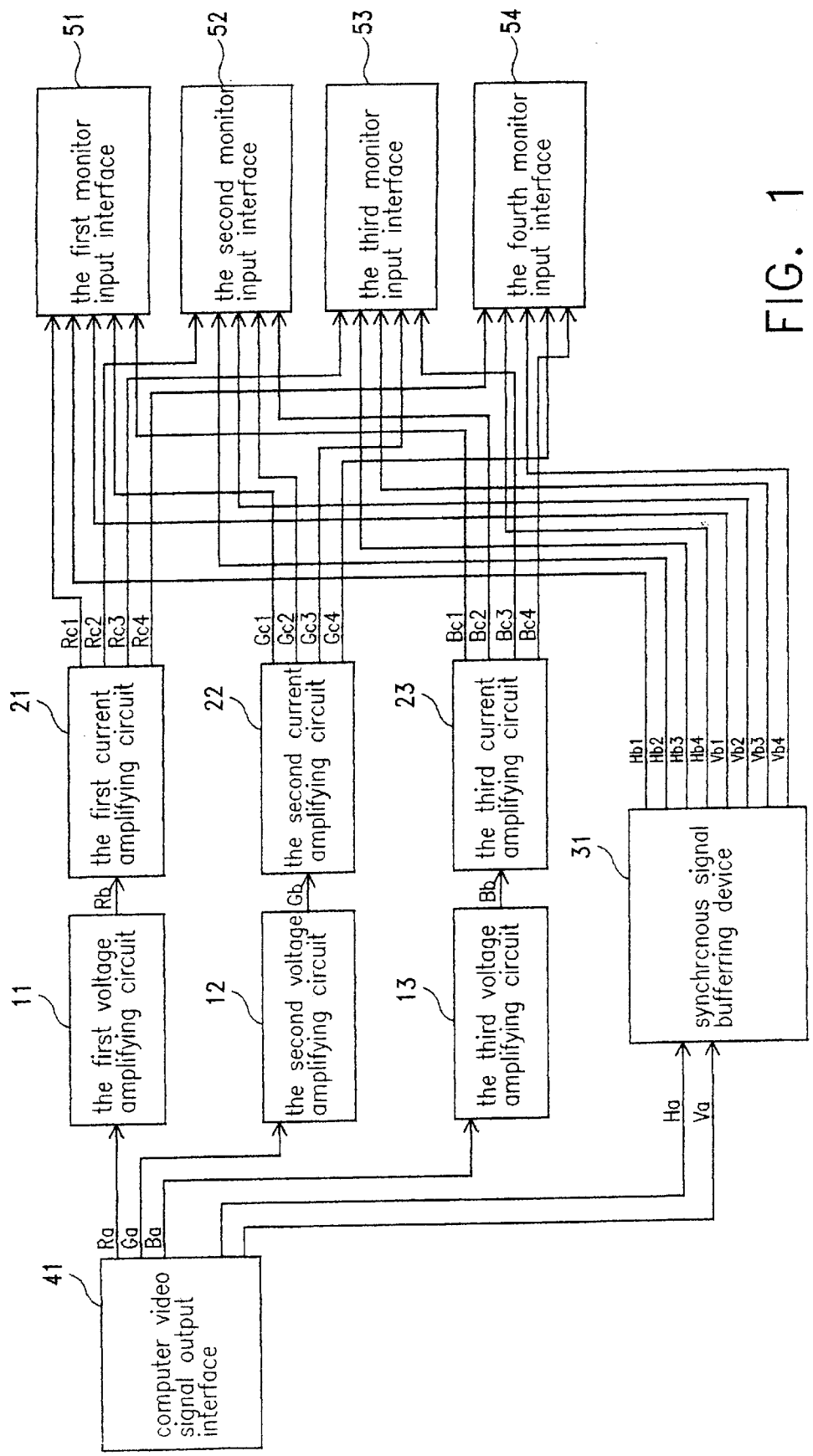
FIG. 1 is a schematic circuit block diagram showing a preferred embodiment of the present invention.

Referring to FIG. 1, which is a schematic circuit block diagram showing a preferred embodiment of the present invention. As shown in the figure, the present invention mainly comprises a first, a second, and a third voltage amplifying circuits 11, 12, 13; a first, a second, and a third current amplifying circuits 21, 22, 23; a synchronous signal bufferring device 31; and a plurality of monitor input interfaces 51, 52, 53, 54.

The inputs of the first, the second, and the third voltage amplifying circuits 11, 12, 13 are connected respectively with the computer video signal output interface 41 of a computer, and the outputs thereof are connected respectively with the inputs of the first, the second, and the third current amplifying circuits 21, 22, 23. Red, green, and blue video signals Ra, Ga, Ba ouputted from the computer video signal output interface 41 will be inputted respectively to one of the voltage amplifying circuits for voltage amplifying and frequency compensation, and generating video signals Rb, Gb, Bb to be ouputted respectively to current amplifying circuits 21, 22, 23.

The inputs of the first, the second, and the third current amplifying circuits 21, 22, 23 are connected respectively with the outputs of the first, the second, and the third voltage amplifying circuits 11, 12, 13, and the outputs thereof are connected respectively with four monitor input interfaces 51, 52, 53, 54. Red, green, blue video signals Rb, Gb, Bb outputted from the first, the second, and the third voltage amplfying circuits 11, 12, 13 are inputted respectively to one of the current amplifying circuits 21, 22, 23 for current amplifing and dividing, and then ouputted respectively to four monitor input interfaces 51, 52, 53, 54. The DC voltage level and the current magnitude of each set of the red, green, blue computer video signals Rc1, Gc1, Bc1; Rc2, Gc2, Bc2; Rc3, Gc3, Bc3; Rc4, Gc4, Bc4 can be adjusted to be the same as the red, green, blue video signals Ra, Ga, Ba from the computer video signal output interface 41.

The inputs of the synchronous signal bufferring device 31 are connected with the computer video signal output interface 41, and outputs thereof are connected with four monitor input interfaces 51, 52, 53, 54. The horizontal synchronous signal Ha and the vertical synchronous signal Va inputted from the computer video signal output interface 41 will generate four sets of horizontal synchronous signals Hb1, Hb2, Hb3, Hb4 and vertical synchronous signals Vb1, Vb2, Vb3, Vb4 to be inputted respectively to four monitor input interfaces 51, 52, 53, 54, so that the four monitors connected with the signal input interfaces can be synchronized with the computer.

Figure 2:
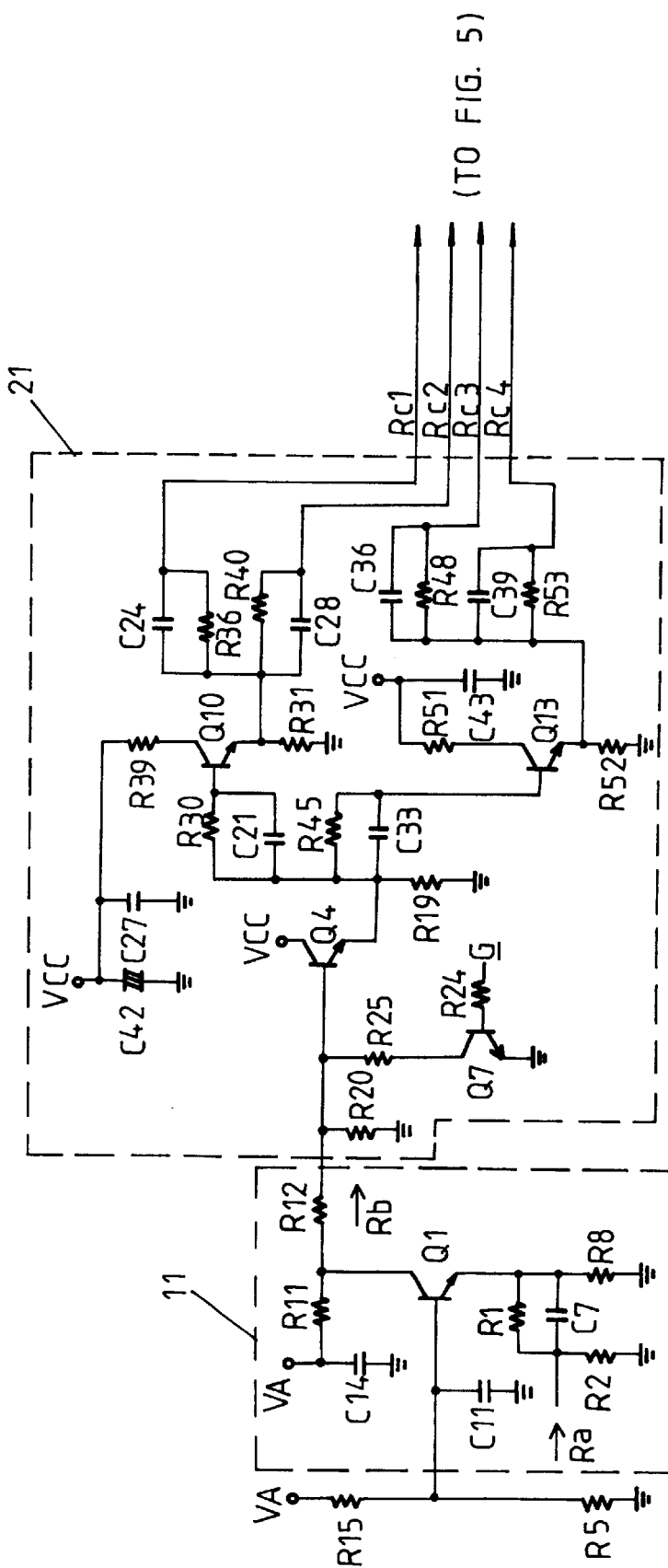
FIGS. 2, 3, 4 and 5 are detailed circuit diagrams of the preferred embodiment of the present invention.
Figure 3:
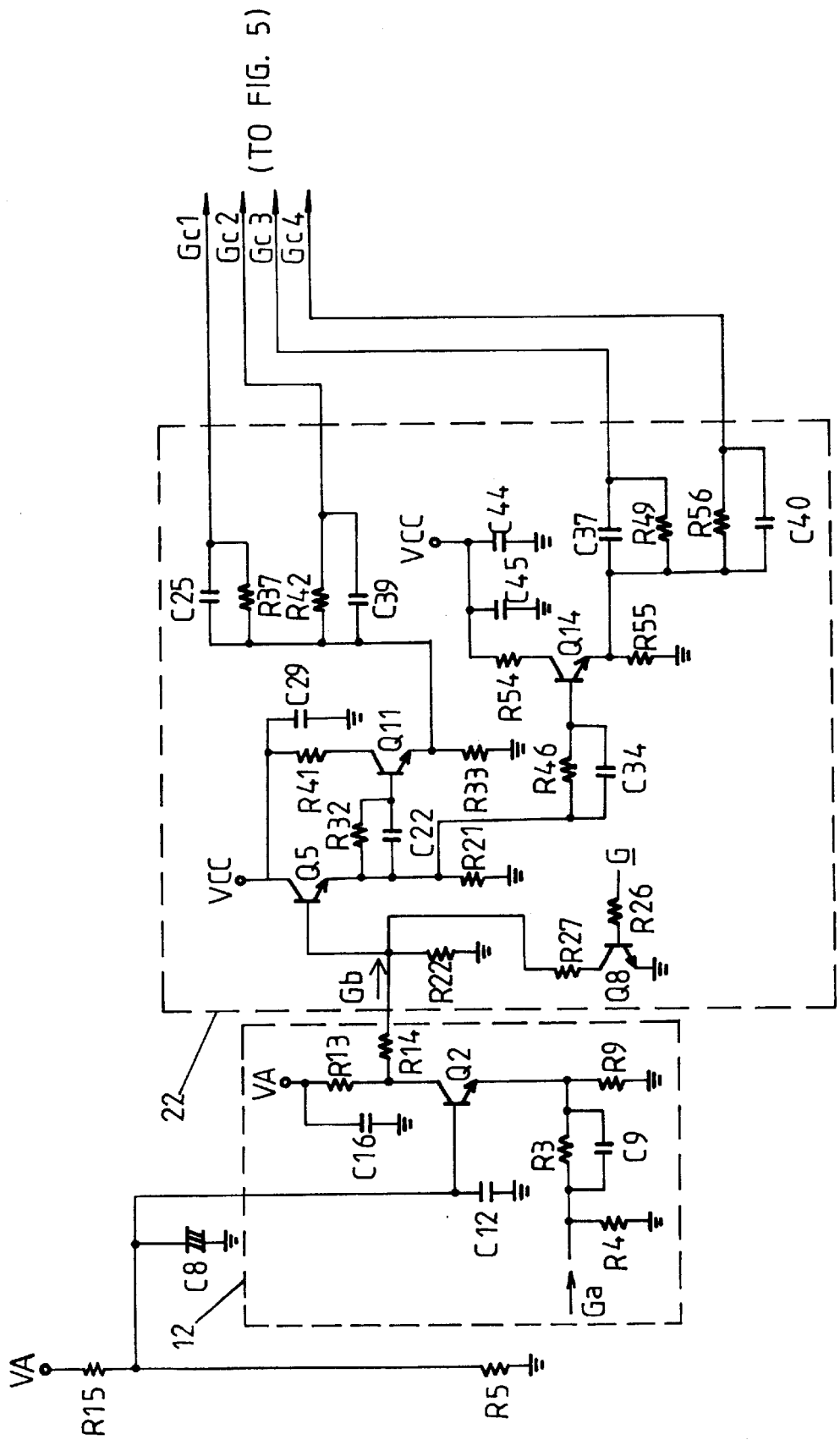
Figure 4:
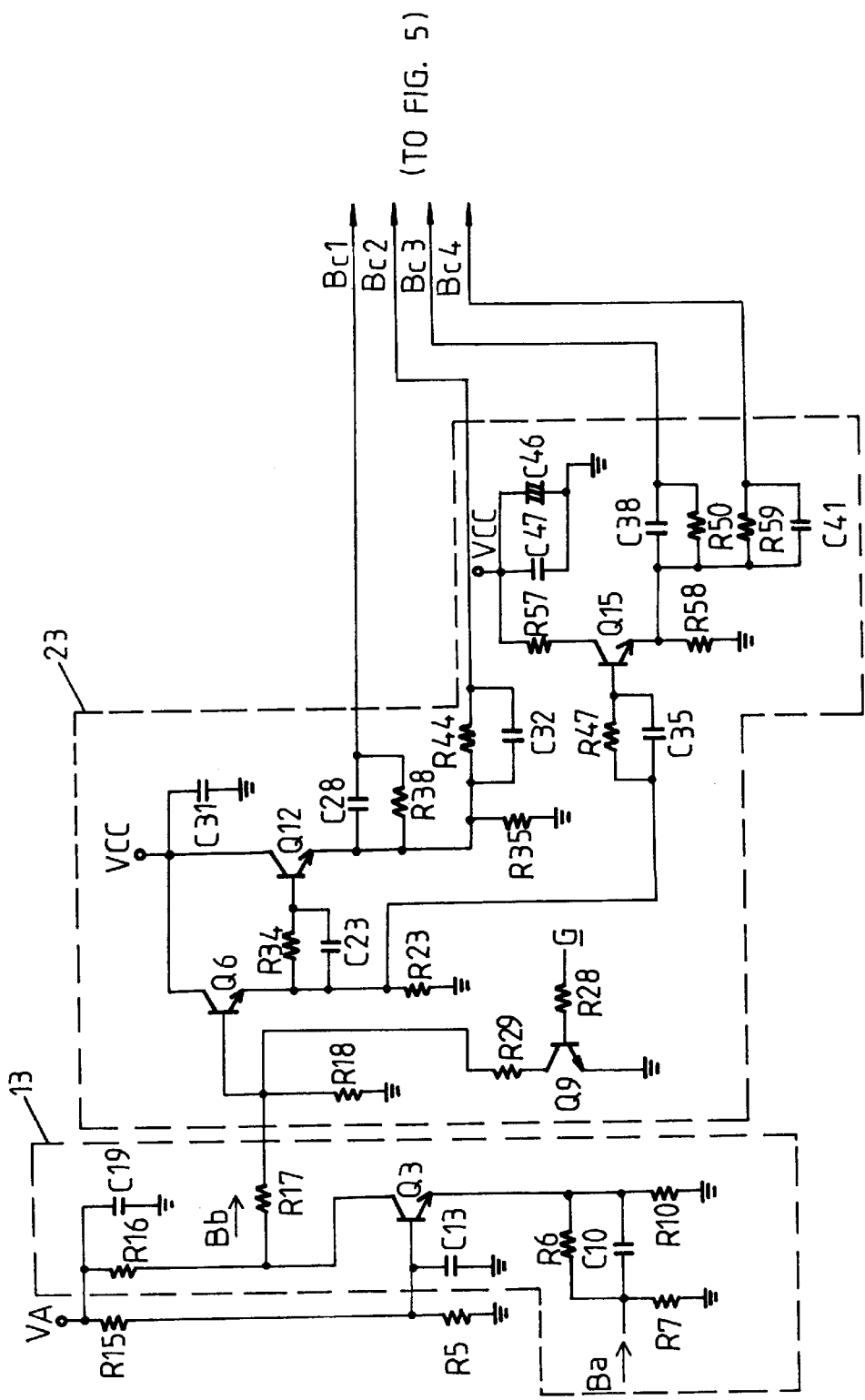
Figure 5:
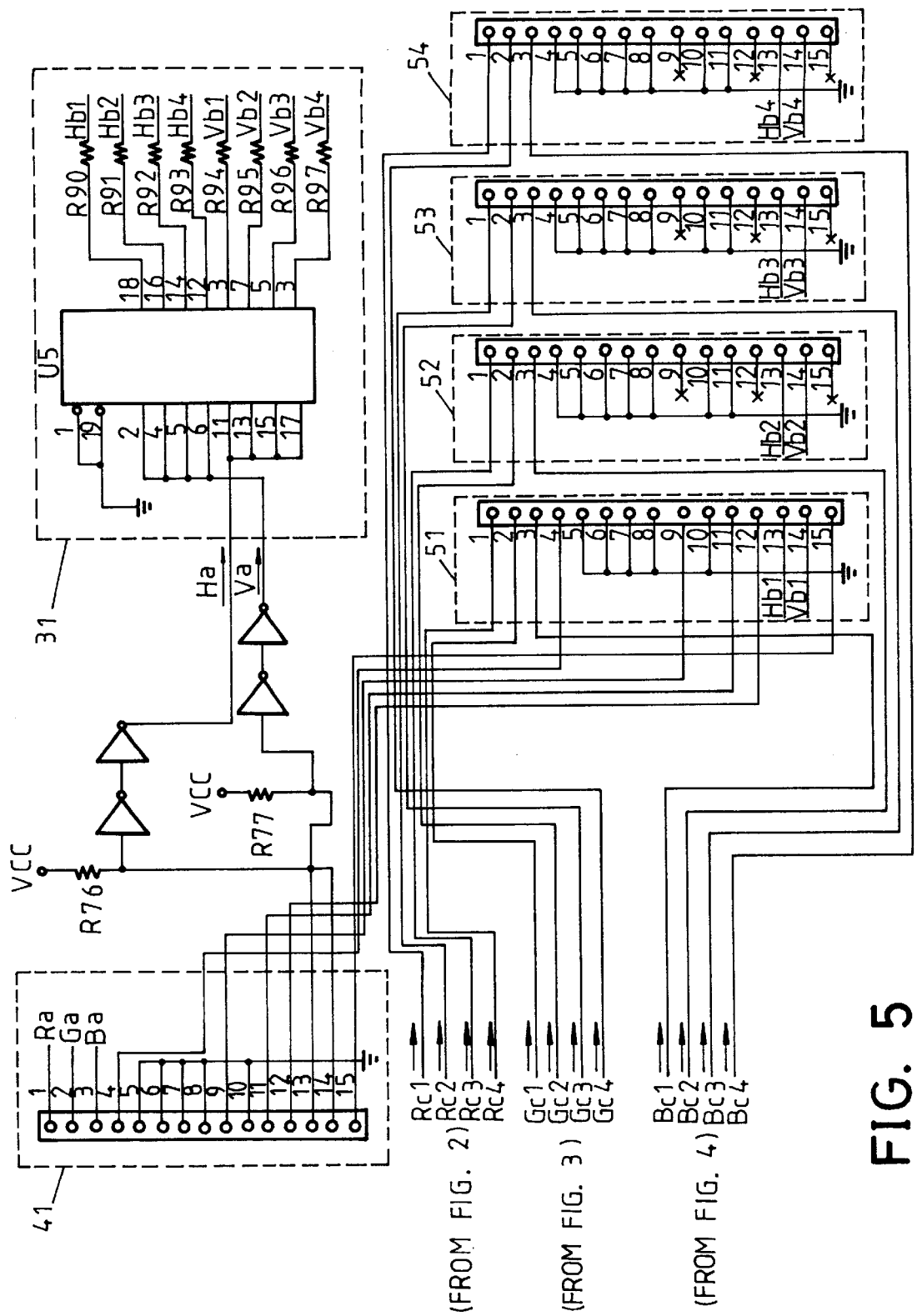

Referring to FIGS. 2, 3, 4, and 5, which are a detailed circuit diagrams of the preferred embodiment of the present invention. As shown in FIG. 2, voltage amplifying circuit 11 is a transistor common base voltage amplifying circuit, wherein R1, R2, R8, C7 are used not only for impedance matching, but also for frequency compensation of the inputted red video signal Ra. Since high frequency AC signals will make capacitor C7 short, thus the red video signal will not be attenuated by resistor R1. The DC bias voltage of the transistor Q1 will be provided by the voltage divider of R15 and R5. Capacitor C8 and multi-layer capacitor C11 connected at the base of transistor Q1 are used for maintaining said base as low AC impedance and as an ideal voltage source (requirements of a common base voltage amplifying circuit), and maintaining the high frequency response of the red video signal. Transistor Q1 is the main amplifying component of the common base amplifying circuit, and can be replaced according to different voltage gain requirements. The resistances of the resistors R11 and R8 can also be adjusted to change the voltage gain. Moreover, by adjusting the resistances of R15, R5, R11 and R8, the collector of Q1 will have a DC operating level of about 1.4V when no video signal is inputted, and the DC operating level of 1.4V will provide the DC operating bias of the first transistor of the first current amplifying circuit 21 so as to achieve the purpose of DC coupling of video signal. The second and the third voltage amplifying circuits 12, 13 shown in FIGS. 3 and 4 are used for processing the green and blue video signals Ga, Ba, just the same as the function of the first voltage amplifying circuit 11, and will therefore not be described again.

In the first current amplifying circuit 21 (shown in FIG. 2), transistor Q7 is used for adjusting the current gain. When G is at a high voltage level, Q7 will be conducting to let current flow, thus the current gain of the first current amplifing circuit will be reduced; when G is at a low voltage level, Q7 will be open-circuited, no current will pass through Q7, thus the current gain will be enhanced. Both transistors Q4 and Q10 are emitter follower circuits to be cascaded together, transistors Q4 and Q13 are also emitter follower circuits to be cascaded together, resistors R30, R45 and capacitors C21, C33 are used for frequency compensation and signal isolation. Inputted Video signal Rb will be divided into two paths after passing Q4, and both the outputs of Q10 and Q13 will also be divided respectively by RC circuits C24, R36; R40, C28; C36, R48; C39, R53, so that four video signals Rc1, Rc2, Rc3, Rc4 are generated for outputting to four monitor input interfaces 51, 52, 53, 54. Each of the red video signals Rc1, Rc2, Rc3, Rc4 can be adjusted to have the same DC voltage level and current magnitude as the red video signal Ra. Two sets of the emitter follow circuits can provide enough current gain and wide bandwidth for the high frequency computer video signals, and Q4, Q10, Q13 can be replaced according to bandwidth requirements. Capacitors C24, C28, C36, C39 are also used for frequency compensation. The second and the third current amplifying circuits 22, 23 shown in FIGS. 3 and 4 are used for processing respectively green and blue video signals Gb, Bb, and have the same function as the first current amplifying circuit 21, so no descrption will be provided again.

In synchronous signal buffering device 31 (shown in FIG. 5), horizontal synchronous signal Ha and vertical synchronous signal Va for the computer video signals are input signals to the IC U5, and generates four sets of horizontal synchronous signal and vertical synchronous signal Hb1, Vb1; Hb2, Vb2; Hb3, Vb3; Hb4, Vb4 for outputting. Each of the four sets of horizontal synchronous signal and vertical synchronous signal has the same driving capability as the original horizontal synchronous signal Ha and vertical synchronous signal Va. IC U5 is a synchronous signal buffering device and can be easily available in the market.

Monitor input interface 51 (shown in FIG. 5), is connected with the ouputs of current amplifying circuit 21, 22, 23, and synchronous signal bufferring device 31 for deliver said ouputs to a monitor. Monitor input interfaces 52, 53, 54 work the same as monitor input interface 51, so video signals are distributed to four independent montors. However, the present invention are not limited to only four monitors, the number of emitter follower circuits can be increased according to the number of monitors. For example, if eight montors are provided, then additional four transistors have to be added as the third cascaded emitter follower circuits for each current amplifying circuit.

It is no doubt that after reading the above descriptions any skillful person in the art can create many different variations without departing the spirit and scope of the accompanying claims. Therefore, it is intended that the appended claims will cover all those variations.

What is claimed is:

1. A computer video signal distributor for inputting video signals of a computer, and then distributing said video signals to a plurality of monitors, comprising:

three transistor common base voltage amplifying circuits for inputting red, green, blue video signals of said computer respectively, and then amplifying said video signals for outputting, each transistor emitter of said voltage amplifying circuits is connected with resistor and capacitor for providing input impedance matching and frequency compensation, and each transistor base of said voltage amplifying circuits is connected with a multi-layer capacitor so that said transistor base has an AC low impedance and high frequency response, and a DC bias voltage of said transistor base is provided from a voltage divider powered by a power source;

three sets of transistor emitter follower current amplifying circuit for connecting respectively with one of the outputs of said three voltage amplifying circuits, providing sufficient frequency response for inputted video signals, and distributting said inputted video signals according to the number of said monitors; each of said transistor emitter follower current amplifying circuit has several cascaded emitter follower transistors, the first cascade has one emitter follower transistor, the second cascade has two emitter follower transistors, the third cascade has four emitter follower transistors, the fourth cascade has eight emitter follower transistors, and so on, the number of cascade depends upon the number of said monitors, each transistor of the last cascade is connected with two RC filter circuits for distributing and frequency compensation;

a synchronous signal buffening device for receiving synchronous signals of said computer, and generating a plurality of sets of synchronous signals according to the number of said monitors;

a plurality of monitor input interfaces for receiving the video ouputs of said three sets of current amplifying circuit, and receiving said plurality of sets of synchronous signals from said synchronous signal bufferring device, then outputting respectively to said monitors.

2. The computer video signal distributor according to claim 1, wherein each transistor used in said voltage amplifying circuits can be replaced according to different voltage gain requirements.

3. The computer video signal distributor according to claim 1, wherein each transistor used in said current amplifying circuits can be replaced according to different bandwidth requirements.

4. The computer video signal distributor according to claim 1, wherein each of said synchronous signals comprising horizontal synchronous signal and vertical synchronous signal.

5. The computer video signal distributor according to claim 1, wherein a transistor is parallel connected between each of said voltage amplfying circuits and current amplifying circuits for adjusting the current gain of said distributor by controlling voltage level of the base of said transistor.

6. The computer video signal distributor according to claim 1, wherein the base bias of the first transistor of each said current amplifying circuit is provided by the collector voltage of the transistor of related front voltage amplifying circuit so as to achieve the purpose of DC coupling of video signal.

* * * * *